United States Patent
Keogh et al.

(10) Patent No.: US 9,431,875 B2
(45) Date of Patent: Aug. 30, 2016

(54) GAS TURBINE GENERATOR WITH A PRE-COMBUSTION POWER TURBINE

(71) Applicant: Scaled Power Corporation, San Francisco, CA (US)

(72) Inventors: Rory Colm Keogh, San Francisco, CA (US); Gregory Thomas, San Francisco, CA (US)

(73) Assignee: Scaled Power Corp., San Francisco, CA (US)

( * ) Notice: Subject to any disclaimer, the term of this patent is extended or adjusted under 35 U.S.C. 154(b) by 154 days.

(21) Appl. No.: 14/229,677

(22) Filed: Mar. 28, 2014

(65) Prior Publication Data

US 2015/0275691 A1    Oct. 1, 2015

(51) Int. Cl.
| | | |
|---|---|---|
| F01D 25/16 | (2006.01) | |
| H02K 7/18 | (2006.01) | |
| F02C 3/073 | (2006.01) | |
| F02C 3/10 | (2006.01) | |

(52) U.S. Cl.
CPC .............. H02K 7/1823 (2013.01); F02C 3/073 (2013.01); F02C 3/10 (2013.01); *F05D 2250/82* (2013.01)

(58) Field of Classification Search
CPC ............................. H02K 7/1823; F01D 15/10
USPC ........................................ 290/52; 60/792, 236
See application file for complete search history.

(56) References Cited

U.S. PATENT DOCUMENTS

| | | | | |
|---|---|---|---|---|
| 4,820,115 A * | 4/1989 | Bandukwalla | ................... | 415/98 |
| 6,073,857 A * | 6/2000 | Gordon et al. | ................ | 237/12.1 |
| 6,606,864 B2 * | 8/2003 | MacKay | ................... | F02C 1/06 60/39.41 |
| 6,735,951 B2 * | 5/2004 | Thompson | ...................... | 60/774 |
| 7,531,932 B2 * | 5/2009 | Ito et al. | ................ | 310/156.34 |
| 7,832,938 B2 * | 11/2010 | McKeirnan, Jr. | ............. | 384/504 |
| 7,926,291 B1 * | 4/2011 | Wilson, Jr. | ...................... | 60/805 |
| 2005/0287018 A1 * | 12/2005 | Mavrosakis | .................. | 417/407 |
| 2009/0145106 A1 * | 6/2009 | Keogh | ................... | F02C 3/045 60/226.1 |
| 2012/0000204 A1 * | 1/2012 | Kesseli et al. | .................. | 60/778 |
| 2013/0164157 A1 * | 6/2013 | Roberts et al. | .............. | 417/406 |
| 2013/0306181 A1 | 11/2013 | Mitchell et al. | | |

OTHER PUBLICATIONS

PCT International Search Report and Written Opinion, PCT Application No. PCT/US2015/022823, Jun. 29, 2015, 11 pages.

* cited by examiner

*Primary Examiner* — Tulsidas C Patel
*Assistant Examiner* — Sean Gugger
(74) *Attorney, Agent, or Firm* — Fenwick & West LLP

(57) ABSTRACT

A turbine generator uses a common bearing carrier to support a high-speed spool and a low-speed spool, thereby enabling a more axially compact turbine generator design. The high-speed spool includes a high-speed compressor assembly mechanically powered by a high-speed turbine, which receives power from a combustion chamber between the high-speed turbine and the high-speed compressor assembly. The low-speed spool includes a pre-combustion power turbine aerodynamically powered by the compressor assembly and upstream of the combustion chamber. The pre-combustion turbine mechanically powers an electrical generator, which includes coreless stators and a rotor assembly. The stators have a planar configuration to receive axial flux from magnets of the rotor assembly. Optionally, the low-speed spool may include a post-combustion turbine that is arranged downstream of the combustion chamber and that mechanically powers the electrical generator.

20 Claims, 4 Drawing Sheets

GAS TURBINE GENERATOR WITH A PRE-COMBUSTION POWER TURBINE

BACKGROUND

This invention relates generally to gas turbine generators, and more particularly to small-scale gas turbine generators, also known as microturbines.

A turbine generator converts stored chemical energy into electrical power to charge a battery or to run an electricity-consuming device. Turbine generators typically combust a chemical fuel such as natural gas, propane, gasoline, or diesel, which heats a working fluid such as air that flows through a turbine. This airflow through the turbine transfers energy from the air into rotational mechanical energy, which drives a generator that converts mechanical energy into electrical energy. Gas turbines are commonly used in stationary power plant facilities, where economic considerations motivate turbine design choices. Hence, many turbine generators are bulky, heavy, and expensive. These characteristics are disadvantageous for vehicular applications, where ideal turbine generators are light, compact, powerful relative to weight, and suitable for mass-production.

SUMMARY

In one embodiment, a turbine generator includes a combustion chamber, a high-speed spool, a low-speed spool, and a common bearing carrier. A compressor assembly on the high-speed spool pressurizes a flow, which expands across a pre-combustion power turbine on the low-speed spool to produce mechanical work. A low-speed shaft connects the pre-combustion turbine to the electrical generator, which consumes mechanical energy from the pre-combustion power turbine. A combustion chamber burns fuel mixed with the pressurized flow from the pre-combustion power turbine. The resulting high-temperature flow expands across a high-speed core turbine on the high-speed spool to transfer mechanical energy to a high-speed shaft, which mechanically powers the compressor assembly.

In one embodiment, the low-speed and high-speed spool are supported by a common bearing carrier. The common bearing carrier is attached to a low-speed bearing assembly, which supports the low-speed spool, and a high-speed bearing assembly, which supports the high-speed spool. The high-speed bearing assembly includes a bearing cartridge fastened to the common bearing carrier by a retaining pin. Because they are supported by the common bearing carrier, the high-speed spool and the low-speed spool have a common axis of rotation. The high-speed bearing assembly may be arranged radially inside the common bearing carrier and the low-speed bearing assembly may be arranged radially outside the common bearing carrier. This configuration enables the high-speed bearing assembly and low-speed bearing assembly to be arranged at approximately the same axial location.

In one embodiment, the turbine generator includes an electrical generator axially located between the high-speed compressor assembly and the high-speed core turbine. The electrical generator includes a rotor assembly operatively coupled to the pre-combustion turbine on the low-speed spool. The rotor assembly may include one or more permanent magnet assemblies and return irons. The electrical generator also includes one or more coreless generator stators electrically excited by an axial magnetic flux received from the rotor assembly. These stators may be fabricated on printed circuit boards.

In an alternative embodiment, the low-speed spool includes a post-combustion power turbine upstream of the high-speed core turbine. The post-combustion power turbine is powered by a high-temperature, pressurized flow from the combustion chamber. The post-combustion power turbine is operatively coupled via the low-speed shaft to the electrical generator to power the electrical generator.

In an alternative embodiment, the pre-combustion power turbine is omitted. The low-speed spool may include a rotating diffuser upstream of the combustion chamber and downstream of the compressor impeller. As an alternative to the rotating diffuser, a stationary diffuser may be placed between the combustion chamber and the compressor impeller.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
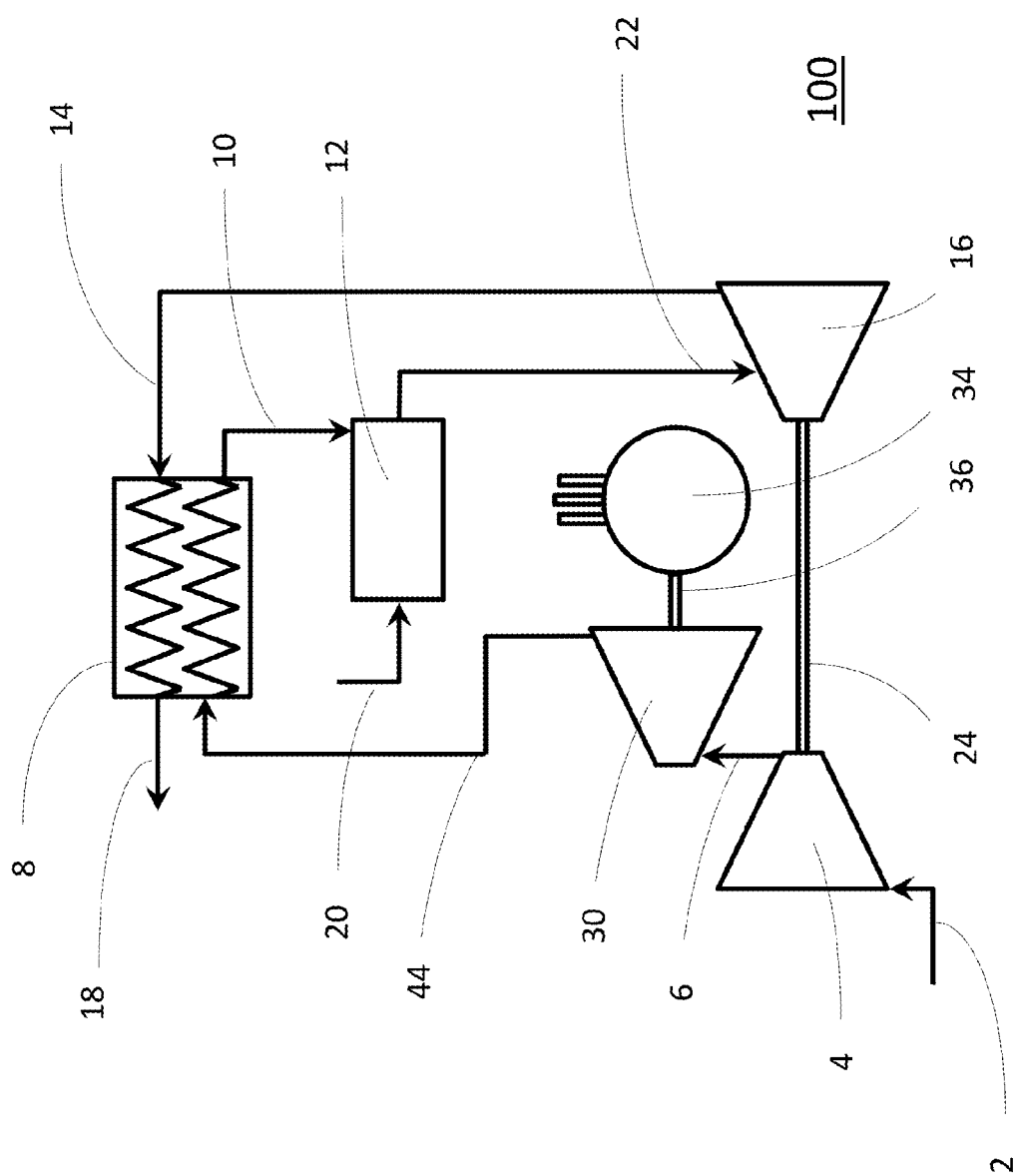
FIG. 1 is a conceptual flow diagram of a two-spool turbine system with a pre-combustion turbine on a common low-speed spool with an electrical generator.

FIG. 1 is a conceptual flow diagram of a two-spool turbine system 100 with a pre-combustion turbine 30 on a common low-speed spool with an electrical generator 34. A flow of a working fluid (typically a gas such as air) enters a compressor assembly 4 through a compressor inlet duct 2. Using mechanical energy, the compressor assembly 4 increases the pressure of the flow, which exits the compressor assembly 4 through the compressor outlet duct 6. In one embodiment, the flow's pressure ratio between the compressor outlet duct 6 and the compressor inlet duct 2 is approximately six-to-sixteen. A high-speed shaft 24 operatively connects the compressor assembly 4 to a high-speed turbine 16 and transfers rotational mechanic energy to the compressor assembly 4 from the high-speed turbine 16.

The compressor outlet duct 6 also serves as an inlet duct to the pre-combustion turbine 30, which is operatively connected to an electrical generator 34 by a low-speed shaft 36 to transfer mechanical energy. In one embodiment, the low-speed shaft 36 rotates at approximately one-quarter to one-half the rate of the high-speed shaft 24. Running the low-speed spool at a lower speed than the high-speed spool reduces the tip speed of the pre-combustion turbine 30, which reduces tensile stresses in the turbine components and enables manufacturing these components using lightweight materials (e.g., aluminum, titanium, polymer) to improve the turbine generator's specific power. The flow expands through the pre-combustion turbine 30 while generating mechanical energy, which decreases the pressure of the flow exiting through the pre-combustion turbine outlet duct 44. In one embodiment, the flow's total pressure ratio between the pre-combustion turbine outlet duct 44 and the compressor outlet duct 6 is approximately two-to-three. Overall, the flow's pressure ratio between the pre-combustion turbine outlet duct 44 and the compressor inlet duct 2 is approximately three-to-six, in one embodiment.

The pressurized flow in the pre-combustion turbine outlet duct 44 enters a heat recovery device 8, which the pressurized working fluid exits through the combustor inlet duct 10. The heat recovery device 8 may be a recuperator or a regenerator, for example. A high-temperature flow enters the heat recovery device 8 through the turbine outlet duct 14 and exits the heat recovery device 8 through the exhaust port 18. While in the heat recovery device 8, the high-temperature flow transfers heat to the pressurized flow through a thermally conductive material that physically separates the flows. As illustrated, the high-temperature and pressurized flows circulate through the heat recovery device 8 in a countercurrent arrangement for improved heat transfer, but another arrangement (e.g., cross flow) may be used instead.

The pressurized flow from the combustor inlet duct 10 mixes with fuel from the fuel inlet 20 in the combustor 12, which ignites the mixture to increase the flow's temperature. The flow exits the combustor 12 through the high-speed turbine inlet duct 22, which directs the flow into the high-speed turbine 16. The hot, pressurized flow expands across the high-speed turbine 16, producing mechanical work that the high-speed shaft 24 transfers to the compressor assembly 4. The flow exits the high-speed turbine 16 through the high-speed turbine outlet duct 14, which discharges the high-temperature flow into the heat recovery device 8.

Two-Spool Turbine System

Figure 2:
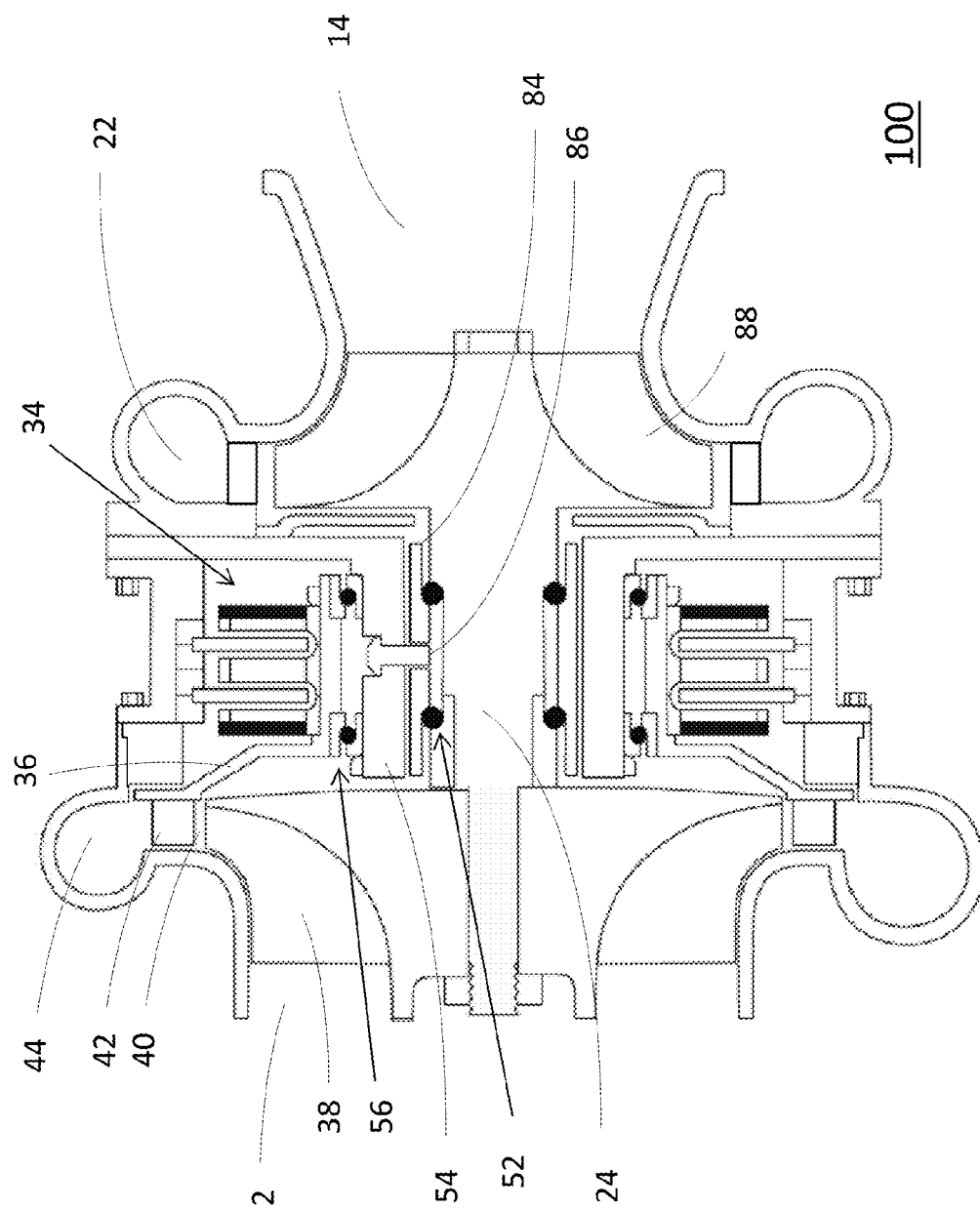
FIG. 2 is a cross-sectional diagram illustrating a two-spool turbine system with a pre-combustion turbine operationally coupled to a low-speed electrical generator.

FIG. 2 is a cross-sectional diagram illustrating a two-spool turbine system with a pre-combustion turbine 30 operationally coupled to a low-speed electrical generator 34. A flow from the compressor inlet duct 2 enters the compressor assembly 4, where the compressor impeller 38 (e.g., a centrifugal impeller) pressurizes the flow. The high-speed shaft 24 operatively connects the components of the high-speed spool, including the compressor impeller 38 and the high-speed turbine impeller 88 of the high-speed turbine 16.

The compressor impeller 38 discharges the pressurized, high-velocity flow into the compressor vaneless space 40, which serves as the compressor outlet duct 6. The flow enters the pre-combustion turbine impeller 42 of the pre-combustion turbine 30, where the flow expands and generates mechanical energy in the pre-combustion turbine impeller 42. In this way, the compressor assembly 4 powers the aerodynamically coupled pre-combustion turbine 30. The pre-combustion turbine impeller 42 discharges the flow through the pre-combustion turbine outlet duct 44. The low-speed shaft 36 operatively connects the components of the low-speed spool, including the pre-combustion turbine impeller 42 and the electrical generator 34. Locating the electrical generator 34 axially between the compressor impeller 4 and the high-speed turbine impeller 88 enhances the system's compact configuration.

The pressurized flow enters the high-speed turbine 16 through the high-speed turbine inlet duct 22 and expands across the high-speed turbine impeller 88, generating mechanical energy for the high-speed spool. The high-speed turbine impeller 88 discharges the still hot flow through the high-speed turbine outlet duct 14. It is noted that the high-speed spool may include a starter motor/generator (not illustrated) to initiate rotation of the high-speed shaft 24 when starting the two-spool turbine system 100, and/or to generate part of the electrical load during operation.

A common bearing carrier 54 is attached to a high-speed bearing assembly 52 radially inside the common bearing carrier 54 and to a low-speed bearing assembly 56 radially outside the common bearing carrier 54. The high-speed bearing assembly 52 supports the high-speed shaft 24 of the high-speed spool and includes a high-speed bearing cartridge 84 fastened to the common bearing carrier 54 by a high-speed bearing retaining pin 86. The low-speed bearing assembly 56 supports the low-speed shaft 36 of the low-speed spool. Because of the common bearing carrier 54, the low-speed spool and the high-speed spool rotate around a common axis of rotation. The common bearing carrier 54 is attached to the low-speed bearing assembly 56 and the high speed-bearing assembly 52 at approximately the same axial location. The use of the common bearing carrier 54 beneficially enables nesting the high-speed spool radially inside the low-speed spool but at approximately the same axial location. This configuration results in a compact configuration of the two-spool turbine system 100.

Electrical Generator

Figure 3:
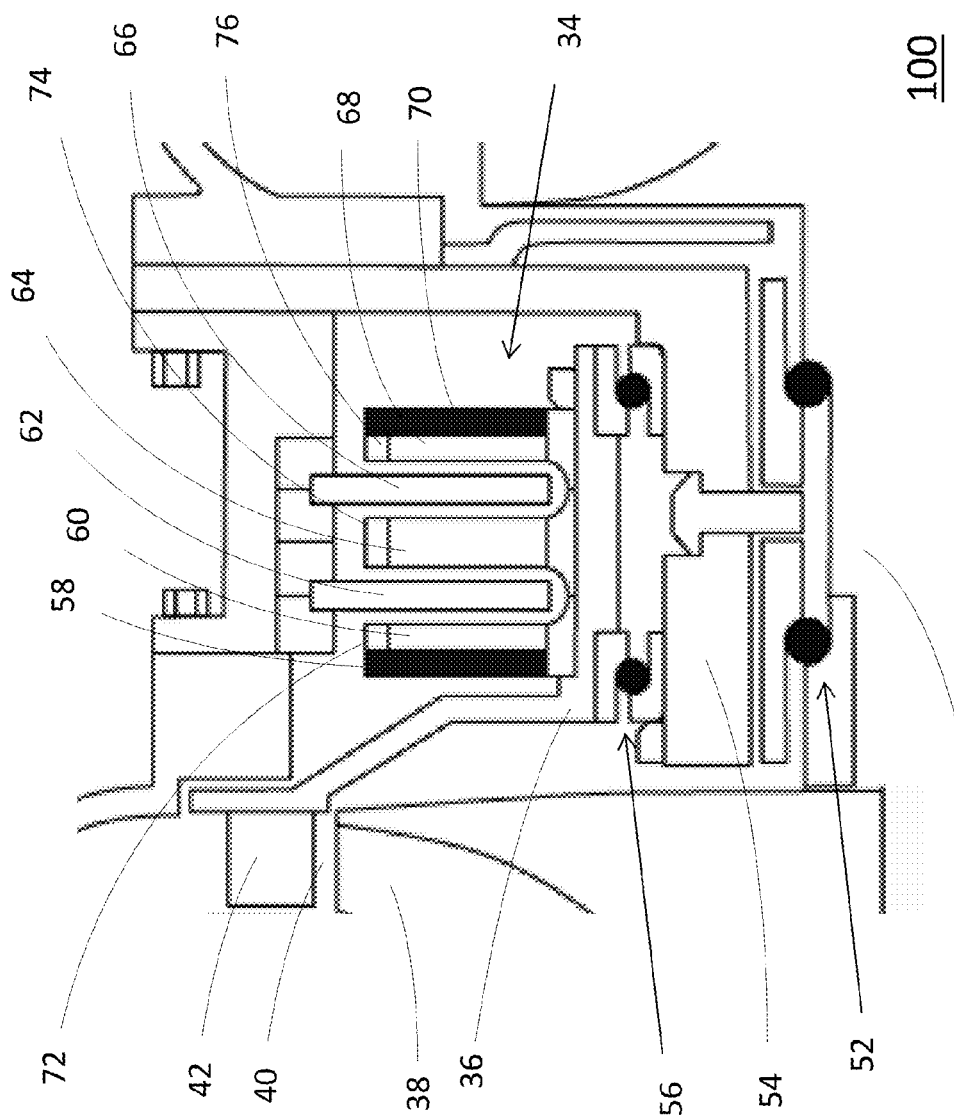
FIG. 3 is an enlarged cross-sectional diagram illustrating an electrical generator on a common low-speed spool with the pre-combustion turbine of the two-spool turbine system.

FIG. 3 is an enlarged cross-sectional diagram illustrating the electrical generator 34 on a common low-speed spool with the pre-combustion turbine 30 of the two-spool turbine system 100. In one embodiment, the electrical generator 34 is a multi-stage axial flux brushless design including coreless generator stators 62 and 66, which are secured to the housing of the system 100. The coreless generator stators 62 and 66 are lighter than stators with an iron core; additionally, the use of coreless stators 62 and 66 reduces audible noise by eliminating torque cogging from stator teeth. The electrical generator 34 also includes a rotor assembly including a front rotor 72, a middle rotor 74, and a back rotor 76. A front permanent magnet assembly 60 is attached adjacent to a front return iron 58 on the front rotor 72. A middle permanent magnet assembly 64 is attached to the middle rotor, and a back permanent magnet assembly 68 is attached adjacent to a back return iron 70 on the back rotor 74. The return irons 58 and 70 are made from a material with high magnetic permittivity relative to air to provide a return path for the magnetic field of the permanent magnet assemblies 60 and 68, respectively.

The rotor assembly, including the permanent magnet assemblies 60, 64, and 68 and the return irons 58 and 70, is operatively coupled to the low-speed shaft 36. When the flow expands across the pre-combustion turbine 30, the low-speed shaft 36 turns the rotor assembly to electrically excite the coreless generator stators 62 and 66 through an axial magnetic flux. The number of rotors, magnet assemblies, and stators may be varied; for example, the middle permanent magnet assembly 64, middle rotor 74, and coreless generator stator 66 may be omitted or duplicated. In one embodiment, the coreless generator stators 62 and 66 have a planar configuration that enables fabrication on printed circuit boards to reduce manufacturing costs. In an alternative embodiment, the electrical generator 34 may be arranged to electrically excite the electrical generator's stators through a radial magnetic flux. Such a configuration may use iron core stators in place of coreless generator stators 62 and 66.

Post-Combustion Turbine

Figure 4:
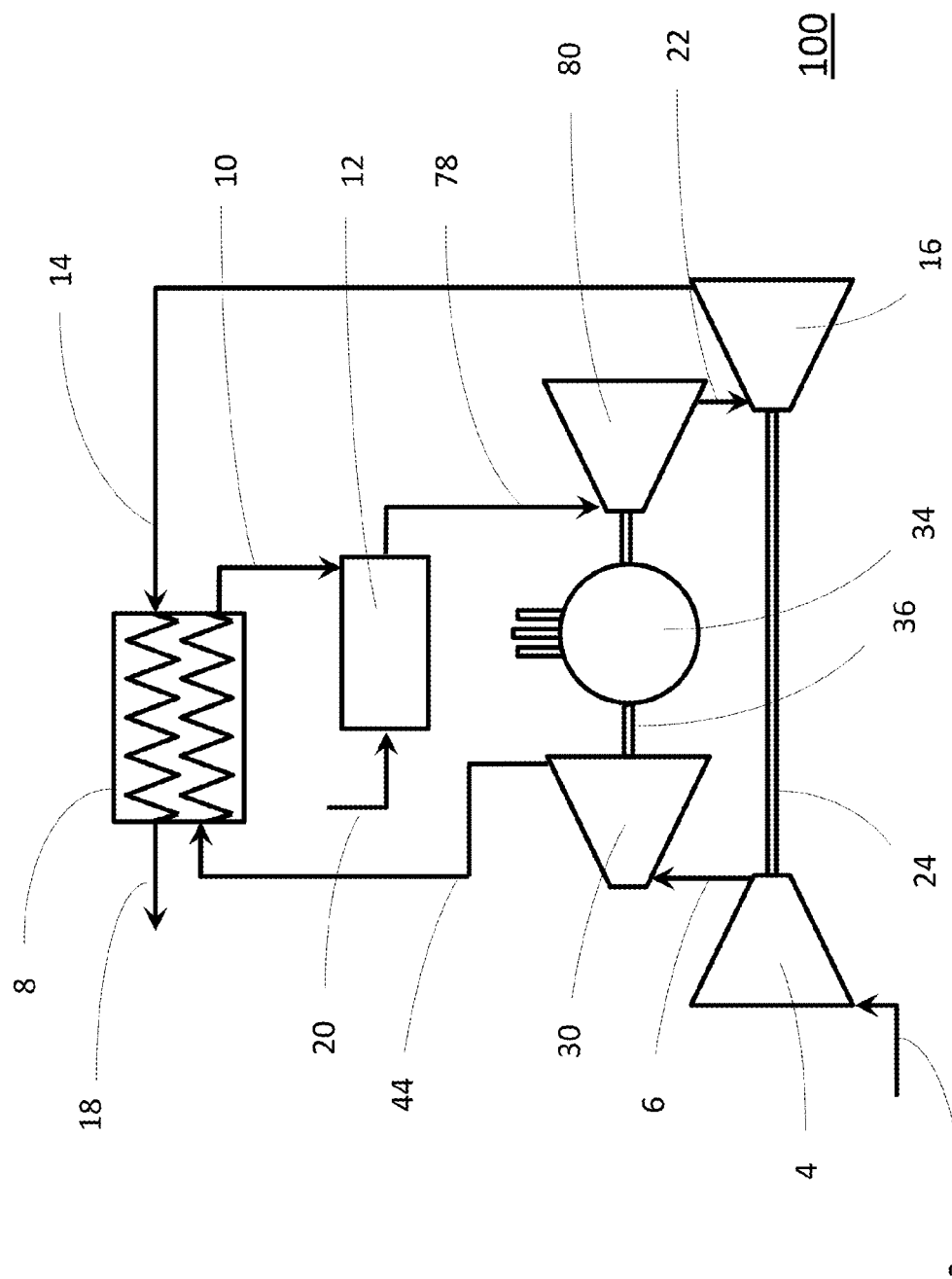
FIG. 4 is a conceptual flow diagram of an alternative embodiment of a two-spool turbine system with a post-combustion turbine on a common low-speed spool with the pre-combustion turbine and the electrical generator.

FIG. 4 is a conceptual flow diagram of an alternative embodiment of the two-spool turbine system 100 with a post-combustion turbine 80 on a common low-speed spool with the pre-combustion turbine 30 and the electrical generator 34. The alternative embodiment is similar to that illustrated in FIG. 1 except for the addition of a post-combustion turbine 80, which is operatively coupled to the pre-combustion turbine 30 and electrical generator 34 via the low-speed shaft 36. The speed of the low-speed spool including the post-combustion turbine 80 is lower than the speed of the high-speed spool, which reduces the tip speed of the post-combustion turbine 80 and consequently reduces tensile stresses enables manufacturing from lightweight materials to improve the turbine generator's specific power. The pressurized flow from the combustion chamber 12 enters the post-combustion turbine 80 through the post-combustion turbine inlet duct 78. The pressurized flow expands in the post-combustion turbine 80, which generates mechanical work transferred to the electrical generator 34. The post-combustion turbine 80 discharges the flow through the high-speed turbine inlet duct 22.

In one embodiment, the post-combustion turbine 80 is manufactured from a ceramic material to withstand the high-temperatures of the combusted flow. As an alternative to ceramic material, the post-combustion turbine 80 may be manufactured from a metallic material and cooled using flow diverted from the pre-combustion turbine outlet duct 44. The cooling flow may be used to internally cool, transpiration cool, or film cool the post-combustion turbine 80. In an alternative embodiment, the system 100 of FIG. 4 includes a rotating diffuser in place of the pre-combustion turbine 30. The rotating diffuser may be operatively coupled to the low-speed shaft 36 to allow the rotating diffuser to rotate at a lower speed than the compressor impeller 38. As an alternative to the rotating diffuser, a stationary diffuser may reduce the flow velocity from the compressor outlet duct 6 to the pre-combustion turbine outlet duct 44.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Additionally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A turbine generator comprising:
   a combustion chamber;
   a high-speed spool comprising a high-speed turbine downstream of the combustion chamber to receive power therefrom, the high-speed turbine operatively coupled to a high-speed compressor assembly upstream of the combustion chamber;
   a low-speed spool comprising a pre-combustion power turbine directly upstream of the combustion chamber and directly downstream of the high-speed compressor assembly to receive power therefrom;
   a common bearing carrier attached to a high-speed bearing assembly supporting the high-speed spool, the common bearing carrier further attached to a low-speed bearing assembly supporting the low-speed spool; and
   an electrical generator located radially outside of the low-speed bearing assembly and between the pre-combustion power turbine and the high-speed turbine, the electrical generator comprising a rotor assembly operatively coupled to the pre-combustion turbine.

2. The turbine generator of claim 1, wherein the high-speed spool and the low-speed spool are arranged to have a common axis of rotation.

3. The turbine generator of claim 1, wherein the high-speed bearing assembly is arranged radially inside the common bearing carrier and the low-speed bearing assembly is arranged radially outside the common bearing carrier.

4. The turbine generator of claim 1, wherein an axial location of the high-speed bearing assembly overlaps with an axial location of the low-speed bearing assembly.

5. The turbine generator of claim 1, wherein the high-speed bearing assembly comprises a bearing cartridge fastened to the common bearing carrier by a retaining pin.

6. The turbine generator of claim 1, wherein the high-speed compressor assembly is aerodynamically coupled with the pre-combustion power turbine.

7. The turbine generator of claim 6, wherein the high-speed compressor assembly comprises a centrifugal compressor impeller arranged to discharge a high-velocity flow of air to the pre-combustion turbine, thereby powering the pre-combustion turbine.

8. The turbine generator of claim 1, wherein the low-speed spool further comprises a post-combustion turbine upstream of the high-speed turbine, the post-combustion turbine directly downstream of the combustion chamber to receive power therefrom.

9. The turbine generator of claim 1, wherein the electrical generator comprises one or more coreless generator stators fabricated on printed circuit boards.

10. A turbine generator comprising:
    a combustion chamber;
    a high-speed spool comprising a high-speed turbine downstream of the combustion chamber to receive power therefrom, the high-speed turbine operatively coupled to a high-speed compressor assembly upstream of the combustion chamber;
    a low-speed spool comprising a pre-combustion power turbine directly upstream of the combustion chamber and directly downstream of the high-speed compressor assembly to receive power therefrom; and
    an electrical generator located radially outside of the low-speed bearing assembly and between the pre-combustion power turbine and the high-speed turbine, the electrical generator comprising a rotor assembly operatively coupled to the pre-combustion turbine.

11. The turbine generator of claim 10, wherein the rotor assembly comprises one or more permanent magnets.

12. The turbine generator of claim 10, wherein the electrical generator comprises one or more stators electrically excited by an axial magnetic flux received from the rotor assembly.

13. The turbine generator of claim 10, wherein the electrical generator comprises one or more stators electrically excited by a radial axial magnetic flux received from the rotor assembly.

14. The turbine generator of claim 10, wherein the electrical generator comprises one or more coreless generator stators fabricated on printed circuit boards.

15. The turbine generator of claim 10, further comprising:
    a common bearing carrier attached to a high-speed bearing assembly supporting the high-speed spool, the common bearing carrier further attached to a low-speed bearing assembly supporting the low-speed spool.

16. The turbine generator of claim 10,
wherein an axial location of the high-speed bearing assembly overlaps with an axial location of the low-speed bearing assembly, and
wherein the high-speed bearing assembly is arranged radially inside the common bearing carrier and the low-speed bearing assembly is arranged radially outside the common bearing carrier.

17. A turbine generator comprising:
a combustion chamber;
a high-speed spool comprising a high-speed turbine downstream of the combustion chamber to receive power therefrom, the high-speed turbine operatively coupled to a compressor impeller upstream of the combustion chamber;
a low-speed spool comprising a post-combustion power turbine upstream of the high-speed turbine and downstream of the combustion chamber to receive power therefrom; and
an electrical generator comprising a rotor assembly operatively coupled to the post-combustion turbine, the rotor assembly operatively coupled to a pre-combustion turbine upstream of the combustion chamber and directly downstream of the compressor impeller to receive power therefrom.

18. The turbine generator of claim 17, further comprising:
a common bearing carrier attached to a high-speed bearing assembly supporting the high-speed spool, the common bearing carrier further attached to a low-speed bearing assembly supporting the low-speed spool.

19. The turbine generator of claim 17, wherein the rotor assembly is operatively coupled to a rotating diffuser upstream of the combustion chamber and directly downstream of the compressor impeller to receive flow therefrom.

20. The turbine generator of claim 17, wherein the turbine generator further comprises a stationary diffuser upstream of the combustion chamber and directly downstream of the compressor impeller.

* * * * *